Patented Feb. 21, 1939

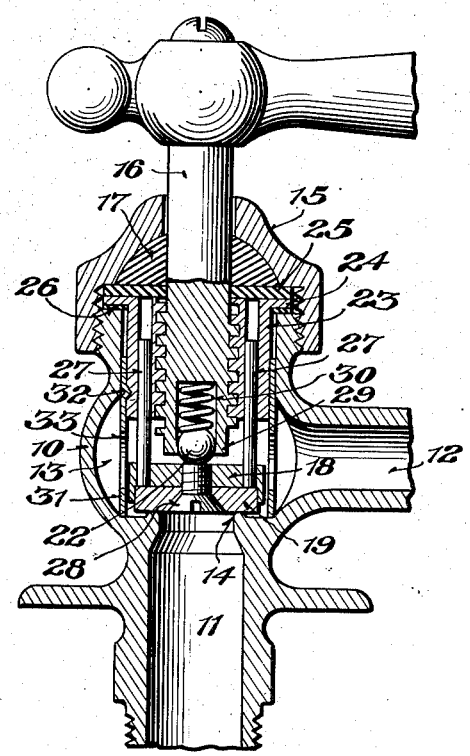

2,147,845

UNITED STATES PATENT OFFICE 2,147,845

LEAKLESS SPIGOT VALVE

Herman H. Kistner, Baltimore, Md.

Application October 11, 1935, Serial No. 44,601

7 Claims. (Cl. 251—139)

This invention relates to shut-off valves for water and fluids generally, but more especially to valves of the faucet type used for household hot and cold water systems.

The invention aims to improve the functioning and extend the period of serviceability of such valves, and comprises improvements in the design and arrangement of the operating parts to provide for equalized seating of the movable valve member and to reduce the wear on the seat and packing.

Further aims and objects are to promote uniform flow, provide for close control of the flow, prevent jamming and preclude dripping when the faucet is shut off, all combined in a simple unitary assembly which may be readily substituted for worn out parts in existing installations at small cost.

What the invention comprises is illustrated by the embodiments shown in the accompanying drawing and hereinafter described.

In the drawing,

Fig. 1 is a part side view and part central vertical cross-section of a domestic water faucet of common type to which a valve assembly has been fitted in accordance with the invention;

Fig. 2 is a side elevation of the sleeve unit shown in Fig. 1;

Fig. 3 is an axial cross-section of the working parts of the valve shown in Fig. 1, showing a modified form of construction of the bushing, movable valve element and guide therefor with which my invention is preferably fitted;

Fig. 4 is a view similar to Fig. 1 of another form of valve wherein the valve assembly screws into the threaded housing without any special preparation of the latter; and Fig. 5 is a view similar to Fig. 3 of still another modification of the invention.

In all of the valves illustrated, the valve body is of conventional type, and is provided with water inlet and outlet passages and a fixed valve seat for a movable valve member, the valve stem opening as heretofore commonly made being threaded to receive an enlarged threaded stem to which the valve disc and packing are fixedly secured by a screw.

According to my invention, upon removal of the worn valve stem and valve from the body, a bushing constituting a guide for a loose valve disc may be inserted in the valve stem opening, and secured in place by the usual packing cap, and a valve stem of more nearly uniform size from end to end is threaded through the bushing to engage the loose valve and hold it tightly against its seat. No change whatever in the body is required in order to adapt my assembly thereto.

In the form of the invention illustrated in Figs. 1 and 2, the body 10 is provided with a passage 11 leading from the supply and an outlet or discharge passage 12, both communicating with the valve chamber 13. Between the inlet or supply passage 11 and the valve chamber is the valve seat 14, which in the illustrated embodiment of the invention is a planar annular flange, i. e., the working face of the seat lies in a plane so as to constitute a circular ring surrounding the end of the supply passage. The valve chamber is closed by a screw cap 15 through which the valve stem 16 passes, packing 17 of rubber or composition being used to prevent leakage around the stem, as is usual in valves of this type.

My invention contemplates the assembling in one unitary assemblage of the valve disc 18 and its packing or working face 19 with the guide means therefor and adapter or bushing through which the lower end of the valve stem 16 screws, the valve disc and face being separate from the valve stem and held on the seat 14 by the ball or other thrust member 22 when the valve stem is rotated to the closed position, as shown in Figs. 1, 3, 4 and 5.

In the construction shown in Figs. 1 and 2, the guide means for the valve is an annular internally threaded bushing 23 having a flange 24 which is secured in the opening to the body beneath the cap 15, the flange 24 being clamped between the inner shoulder of the cap and the end of the body, a brass or fiber washer 25 being placed between the cap and bushing member and a copper gasket 26 or fiber packing of annular form being placed between the flange 24 and the end of the valve body 10.

The valve 18 is guided by two diametrically disposed pins 27 secured thereto and sliding freely in corresponding holes in the bushing 23. A screw 28 is advantageously used for securing to the valve disc the wear face or packing 19, and the end of this screw may be hardened for the ball or other thrust member 22 to bear against. A spring 30 is arranged in the lower end of the stem to hold the ball 22 in its seat 29 formed by spinning in the edge of the hole in the stem, this spring being strong enough to hold the valve disc upon its seat 14 against the pressure of the fluid below it tending to lift it.

A splash shield in the form of an apertured thimble 31 is adjustably mounted on the exterior of the bushing 23 to surround the valve disc and seat and bear against the bottom of the chamber in the valve body 10. This shield may be held in adjusted position by a prick punch mark 32 to suit the particular valve body in which it may be used. Orifices 33 in the lower part of the shield 31 permit passage of the liquid when the valve is opened by rotating the valve stem in the direction to raise it. These orifices are spaced circumferentially to distribute the flow of liquid in radial streams, there being four such in the valve illustrated. These streams impinge on the inner surface of the chamber in the valve body and their intensity is dissipated, so that they emerge from the chamber through the discharge passage 12 at greatly reduced velocity, thereby reducing the tendency to splash.

In the form of the invention illustrated in Fig. 3, the bushing 35 has a skirt portion 36 depending from its lower edge and surrounding the valve seat 14 to position the valve and to prevent splashing. Orifices 33' are formed in the skirt similar to the orifices 33 in the thimble 31. The bushing is fitted with a pin 37 for guiding the valve disc 38, which is notched at one side to receive it, thereby preventing the valve from turning with the valve stem 16'. Instead of a ball and spring for holding the valve against the seat, a hardened steel pin 39 with a rounded end is fitted in the hole in the end of the valve stem 16' and held in place by spinning in the metal around the edge of the hole. A valve face 40 made of soft metal, composition, fiber or rubber is secured to the valve 38 by means of a screw 28 against the hardened flat end of which the rounded end of the pin 39 bears to retain the valve on its seat in closed position.

Instead of a pin seated in a cylindrical hole in the end of the valve stem for engaging the valve 40 to hold it against its seat, a hardened steel ball may be used, loosely fitted in a correspondingly shaped recess in the end of the valve stem 16", as shown in Fig. 4. This figure also illustrates another design of bushing 42, provided with screw threads on its exterior for securing it in the threaded opening 43 in the body 44. The ball 45 bears against the flattened end of the screw 28 to prevent wear and permit the valve to adjust itself to the seat. The space between the valve 38 and skirt 46 of the bushing permits sufficient freedom of motion for the valve to float freely in the chamber in the lower end of the bushing, and thereby greatly prolongs the life of the valve face 40.

A spacing washer 47 is provided between the cap 15 and fiber washer 25, and as many packing washers 26 may be used as are necessary to fit the bushing to the space in the housing.

In the form of the invention illustrated in Fig. 5, the bushing 48 screws into the housing 49 in place of the threaded valve stem commonly used in this type of valve, thereby permitting substitution of my valve assembly for the original valve assembly without changing the housing in any particular. The bushing 48 is threaded for a valve stem 16 like those of the other valves described herein, and at its lower end is recessed to receive a split sleeve 50 which is perforated to allow the fluid to escape through it without causing splashing. This sleeve is retained by friction within the bushing and may be adjusted to bear upon the lower wall of the valve chamber surrounding the valve. It also serves to position and guide the valve member 51, which may be fitted with a face 52 of composition, fiber, soft metal or other suitable material.

My improvements are adaptable to new valve fittings as well as to those already in use, and I do not restrict my invention to the replacement of worn parts in existing valves although it is peculiarly suitable for such purpose.

I claim the following as my invention:

1. A replaceable valve assembly for valves of the type having a chamber with a planar circular seat, said assembly comprising a bushing adapted to be secured in the valve chamber, said bushing being threaded to receive the valve stem, a valve loosely associated with said bushing and valve stem to be engaged by the latter, said valve stem having a thrust member at its lower end consisting of a hardened steel ball backed by a spring for engaging said valve at its center, means for preventing rotation of said valve with said stem, and a flat face on said valve for engaging the seat in said chamber.

2. A shut-off valve having a body with a chamber, an inlet passage leading to said chamber and terminating in a circular valve seat, a valve cooperating with said seat and means for retaining it in closed position, a bushing in said body supporting said valve retaining means, a deflector carried by said bushing and encircling said valve and seat, said deflector being adjustable on said bushing.

3. In a hand controlled valve of the type having a planar cylindrical seat, a disc valve cooperating with said seat, a screw stem adapted to have a bearing on said valve, said bearing comprising a hardened rounded bearing face and a hardened flat bearing face carried by said stem and valve, respectively, and guide means permitting limited transverse and axial movement of said disc but preventing rotation thereof with said stem.

4. The combination of a valve body having a valve chamber with a planar circular seat and a screw cap for closing said chamber, with a replaceable unitary valve assembly comprising a bushing having a flange around its outer end fitting within said cap between it and said body and adapted to be secured thereby in the valve chamber, said bushing being threaded to receive the valve stem, a valve loosely associated with said bushing and guided thereby in position to be freely engaged by the valve stem, said valve stem having a point contact thrust member at its lower end for engaging said valve at its approximate center, and a flat face on said valve for engaging the seat in said chamber.

5. A valve for household water systems comprising a body having an inlet passage terminating at a planar circular seat, a flat valve cooperating with said seat, means for holding said valve on said seat, a bushing in said body supporting said valve holding means, a one piece thimble adjustable on said bushing and surrounding said valve and seat, said body having a space surrounding said thimble communicating with the discharge outlet, and said thimble having spaced apertures of restricted size for permitting flow of water from said valve seat to said outlet passage space when said valve holding means is released.

6. A replaceable unitary valve assembly for valves of the type having a chamber with a planar circular seat, said assembly comprising a bushing adapted to be secured in the valve chamber, said bushing being threaded to receive the valve stem, a deflector carried by said bushing for encircling said valve seat, a valve loosely associated with said bushing and guided by said deflector in position to be freely engaged by the valve stem, said valve stem having a point contact thrust member at its lower end for engaging said valve at its approximate center, and a flat face on said valve for engaging the seat in said chamber.

7. The combination with a valve body having a valve chamber with a circular seat, of a replaceable unitary valve assembly comprising a threaded valve stem, a bushing having its inner end seated on said circular seat, means for removably securing said bushing in said valve body, said securing means being apertured to receive the valve stem, a valve loosely associated with said bushing and guided thereby in position to be freely engaged by the valve stem, said valve stem having a point contact thrust member at its lower end for engaging said valve at its approximate center, and a flat face on said valve for engaging a planar circular seat encircled by said bushing, said valve stem, valve and bushing being operatively connected and removable from said body as a unit.

HERMAN H. KISTNER.